US007998300B2

(12) United States Patent
Hladilek et al.

(10) Patent No.: US 7,998,300 B2
(45) Date of Patent: Aug. 16, 2011

(54) APPARATUS AND METHOD FOR PRODUCING WATERPROOF STRUCTURAL CORRUGATED PAPERBOARD

(75) Inventors: Michael B. Hladilek, Phillips, WI (US); Carl R. Marschke, Phillips, WI (US)

(73) Assignee: Carl R. Marschke, Phillips, WI (US)

( * ) Notice: Subject to any disclaimer, the term of this patent is extended or adjusted under 35 U.S.C. 154(b) by 32 days.

(21) Appl. No.: 12/558,809

(22) Filed: Sep. 14, 2009

(65) Prior Publication Data

US 2011/0061791 A1 Mar. 17, 2011

(51) Int. Cl.
*B32B 37/06* (2006.01)
*B32B 37/20* (2006.01)

(52) U.S. Cl. ......... 156/201; 156/205; 156/210; 156/285

(58) Field of Classification Search ........................ None
See application file for complete search history.

(56) References Cited

U.S. PATENT DOCUMENTS 2,416,232 A 2/1947 Soday
2,728,567 A 12/1955 Farnworth
3,402,068 A 9/1968 Wilkins
4,285,749 A * 8/1981 Stiles ........................... 156/180
4,701,488 A * 10/1987 Williams ..................... 524/266
4,976,993 A 12/1990 Sutera
5,619,806 A * 4/1997 Warren .......................... 34/331
5,891,302 A 4/1999 Marschke
7,459,049 B2 12/2008 Marschke
2008/0010943 A1 1/2008 Marschke
2008/0020080 A1 1/2008 Marschke

FOREIGN PATENT DOCUMENTS

EP 0826486 3/1998
JP 70008799 B * 3/1970

OTHER PUBLICATIONS

International Search Report and Written Opinion dated Mar. 4, 2011.

* cited by examiner

*Primary Examiner* — Sam C Yao
(74) *Attorney, Agent, or Firm* — Andrus, Sceales, Starke & Sawall, LLP

(57) ABSTRACT

Two paper webs, saturated with a B-phase phenolic resin and dried, are conveyed through separate low melting point metal alloy baths, one web after being corrugated, to convert the resin to a fully cured phase, whereafter the webs are joined to form a structurally rigid waterproof single face corrugated web.

7 Claims, 3 Drawing Sheets

APPARATUS AND METHOD FOR PRODUCING WATERPROOF STRUCTURAL CORRUGATED PAPERBOARD

BACKGROUND OF THE INVENTION

The present invention relates to the manufacture of corrugated paperboard for use in structural applications in which waterproofing is imperative. More particularly, the invention pertains to a method and apparatus for converting corrugated medium and liner webs impregnated with a B-phase phenolic resin to a fully cured phase to produce a waterproof single face corrugated web.

U.S. patent application Ser. No. 11/769,879, filed on Jun. 28, 2007, which is incorporated herein by reference, describes a method and apparatus for manufacturing open core elements from paperboard webs for applications which might include exposure to water and high humidity. In such applications, the paperboard web must be treated to prevent damage and loss of strength in the presence of water. The hollowcore elements produced in accordance with the above identified patent lend themselves to many structural applications, including relatively narrow structures such as doors and much wider and deeper structures such as walls, decks, floors and beams.

One advantage of the method described in the above identified application, in addition to the broad flexibility of the process, is the high output attainable by the unique method for laying up the open core elements. If a waterproof paperboard web is required, it is important that the waterproofing process is fast and accurate enough to fit into the lay-up process without loss of time and quality.

SUMMARY OF THE INVENTION

In accordance with the basic method of the present invention, a method for curing a paper web impregnated with a B-phase phenolic resin, includes the steps of (1) providing a bath of a low melting point metal alloy that is hot enough to convert the resin to a fully cured phase, (2) carrying the web through the bath to provide direct contact of a web face with the metal alloy, and (3) maintaining contact of the web with the molten alloy for a time sufficient to fully cure the resin. The conveying step may comprise immersing the web completely in the molten alloy bath. Preferably, the conveying step comprises (1) providing the bath with opposite side walls that define coplanar upper edges, and upstream and downstream end walls that have upper edges below the upper edges of the side walls, and (2) conveying the web on the underside of the conveyor in a path between the side walls and over the end walls. Preferably, the method includes the step of sealing the interface between the lateral edges of the conveyor and the side walls.

In another aspect of the invention, the web is corrugated prior to conveying the web through the molten alloy bath. The corrugating step comprises carrying the web between upper and lower fluting conveyors having interengaging fluting bars. In accordance with this aspect of the invention, the corrugated web is maintained on the upper fluting conveyor for travel through the bath. Specifically, the method includes the steps of (1) conveying a paper liner web that is impregnated with a B-phase phenolic resin, through a molten alloy bath to convert the phenolic to a fully cured phase, and (2) joining the converted corrugated web to the converted liner web to form a composite single face web. The joining step preferably comprises (1) applying an adhesive to the flute tips of the corrugated web, and (2) pressing the liner web against the flute tips.

The present invention also includes an apparatus for curing a fluted paper web that is impregnated with a B-phase phenolic resin, comprising a heated bath for holding a molten low melting point metal alloy, the bath having a bottom wall, opposite side walls extending vertically upward from the bottom wall and defining upper edges of the bath, an upstream alloy supply header that extends between the side walls and has a horizontal upper edge below the upper edges of the side walls and defines a molten metal distribution reservoir. A downstream weir dam has an upper edge that is coplanar with the upper edge of the supply header and defines a trough for receiving molten metal alloy overflowing the weir. A pump supplies the molten metal alloy to the upstream supply header and returns molten metal to the header from the downstream trough in a closed circuit. A web conveyor including a plurality of interconnected articulated flights that are shaped to form and adapted to carry the fluted web on the underside thereof to run through the molten metal bath between the side walls and over the upper edges of the supply header and the weir dam.

The molten metal distribution reservoir preferably comprises an inlet for molten metal alloy that is centered between the side walls of the bath, and a distribution manifold that is adapted to equalize the distribution of the molten alloy returned by the pump laterally across the length of the manifold. The distribution manifold preferably has a symmetric pattern of alloy feed holes that extend laterally in opposite directions from the center inlet. The conveyor flights may be heated to preheat the incoming web. The flights preferably comprise aluminum extrusions. A continuous sealing strip is provided between the side walls and the lateral edges of the conveyor to inhibit leakage of the molten metal alloy. The sealing strips preferably comprise low friction plastic strips that are attached to the side wall.

A key feature of the present invention is an apparatus for making a waterproof corrugated single face web from two paper webs that are impregnated with a B-phase phenolic resin. The apparatus comprises a corrugator for one of the webs that has a pair of interengaging upper and lower conveyors, each of which has a plurality of interconnected articulated flights shaped to form a corrugated web from the web carried therebetween. The web 10, with the phenolic resin in the B-phase, is quite flexible and readily corrugated. A low melting point alloy bath in the path of the upper conveyor provides direct contact of the alloy with the corrugated web on the upper conveyor sufficient to convert the resin to a fully cured phase. Means are also provided for heating the other paper web to a temperature sufficient to convert the resin to the fully cured phase. A single facer is provided to join the converted corrugated web and the other web to form the single face web. The heating means for the other web preferably comprises another low melting point alloy and a separate conveyor to immerse and carry the other web through the second bath.

DETAILED DESCRIPTION OF THE PREFERRED EMBODIMENT

Figure 1:
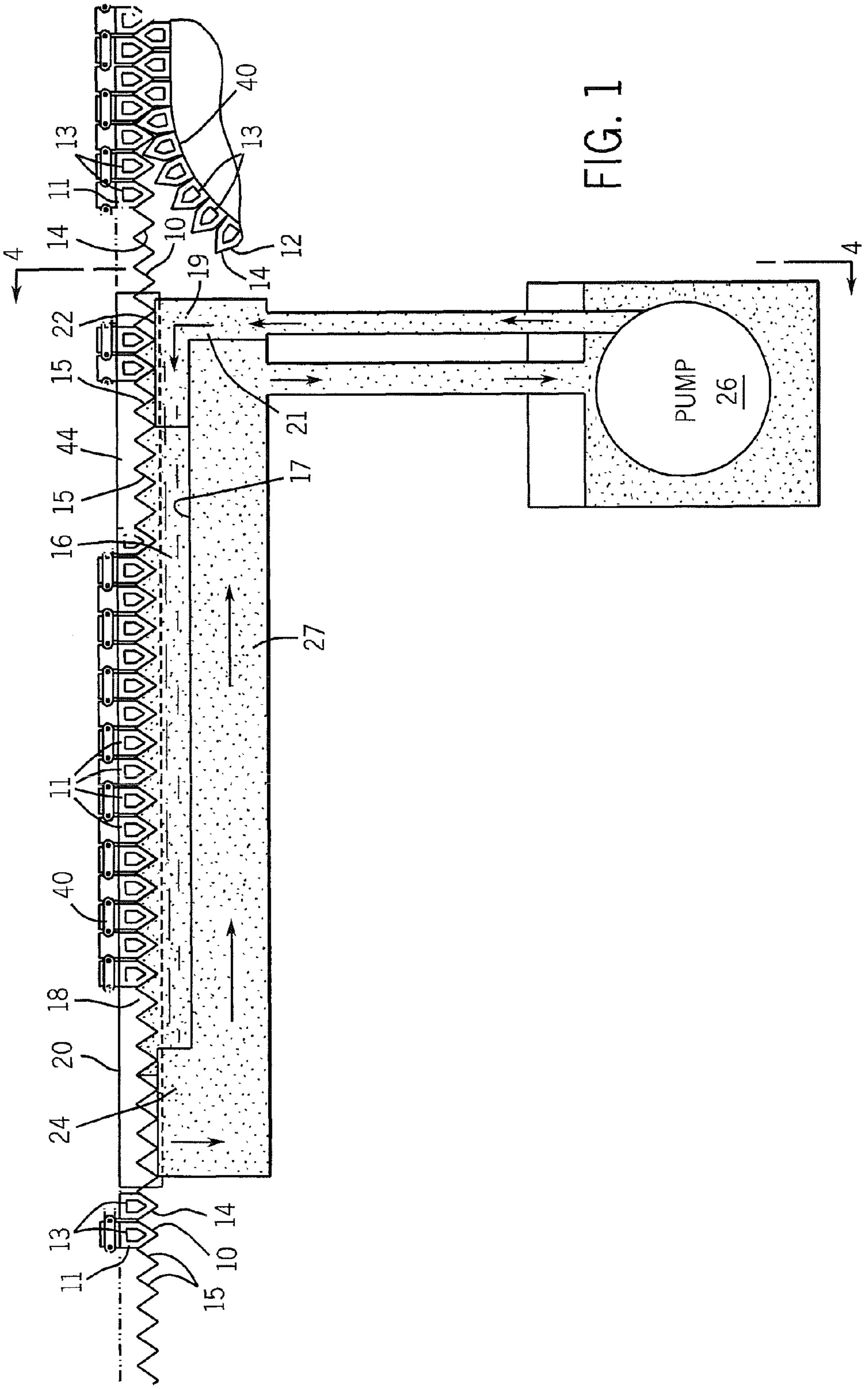
FIG. 1 is a side elevation schematic of the curing apparatus for a corrugated paper web.

Referring initially to FIG. 1, a corrugated medium web 10 made from a paper web impregnated with a B-phase phenolic resin must be heated to a curing temperature sufficient to convert the B-phase resin to a fully cured phase in which the web is fully waterproof. The cured web also becomes substantially more stiff and severe bending of the web is thereafter restricted. However, web stiffness is an important characteristic of the corrugated web and the treated liner web to which it is attached, as will as discussed below, for processing in accordance with the method of open core element manufacturing disclosed in the above identified copending application.

In the embodiment shown, the medium web 10 is corrugated between interengaging upper and lower corrugating conveyors 11 and 12, respectively. Each of the conveyors 11 and 12 comprises a belt of interconnected articulated flights 13 that have flute-forming teeth 14 to provide flutes of a desired depth and pitch. For example, flutes having a pitch of ¾ in. (19 mm) and a depth of ½ in. (13 mm) are satisfactory. The flights, preferably of aluminum, may be heated to minimize heat loss in the treatment bath to be described.

A heated bath 16 is positioned to receive the corrugated medium web 10 after it is formed and the lower corrugating conveyor 12 is directed away from the web and downwardly in a return run. The corrugated web 10 is retained on the underside of the upper corrugating conveyor 11 where the web flutes 15 remain in intimate contact with the teeth 14 of the conveyor flights 13.

The bath 16 contains a low melting point metal alloy that is used to heat the web 10 and cure the phenolic resin as it passes through the bath 16 in contact with the molten alloy. One particularly well suited alloy is a 60/40 bismuth-tin alloy which is heated to about 400° F. (about 200° C.). Electric resistance heating may be used to maintain the bath temperature, but other heat sources may also be used. The bath has a generally horizontal bottom wall 17, enclosed laterally by a pair of side walls 18 defining coplanar upper edges 20. The upstream end of the bath is defined by an alloy supply header 21 that extends between the side walls 18 and has a horizontal upper edge 22 that is lower than the upper edges 20 of the side walls. The supply header 21 defines a molten metal distribution reservoir 23 for the uniform supply of molten alloy. The downstream end of the bath 16 is defined by a weir dam 24 that has a horizontal upper edge 25 that lies generally coplanar with the upper edge 22 of the upstream supply header 21. The weir dam 24 defines an open slot 29 for receipt of the molten metal alloy that overflows the weir.

The molten metal is circulated through the bath in a closed circuit including a pump 26 receiving molten metal flowing into the slot 29 in the weir dam 24 and returning it to the alloy supply header 21 where it is distributed evenly and uniformly across the upstream end of the bath and downstream of the upstream end wall 19.

In operation, the corrugated medium web 10 is carried by the upper conveyor 11 such that the tips of the flutes 15 slide over the upper edge 22 of the upper end wall and into contact with the molten alloy. The alloy in the bath is forced by pump pressure up into the flutes on the conveyor teeth 14. Pump pressure is adjusted to provide sufficient head to fill the web flutes, preferably with a slight over-pressure to assure the underside of the fluted web 10 is fully contacted by the molten alloy. Movement of the conveyor causes the flutes to assist in carrying the alloy downstream and over the weir dam 24. This action assures that the corrugated medium web 10 carried on the conveyor 11 is fully contacted by the molten alloy. This, in turn, assures that the entire web 10 is heated sufficiently to convert the phenolic resin to the fully cured phase. As the upper conveyor 11 and attached corrugated web 10 reach the downstream end of the bath, the flutes 15 engage and slide over the upper edge 25 of the weir dam 24 and the alloy drops into the slot 29 and travels through return passages 28 in the side walls 18 of the bath by operation of the pump 26.

With a medium web 10 saturated with about 15% by weight of B-phase phenolic, the web is fully cured if it is retained in a bath of alloy at the indicated temperature for about 4 seconds.

Figure 2:
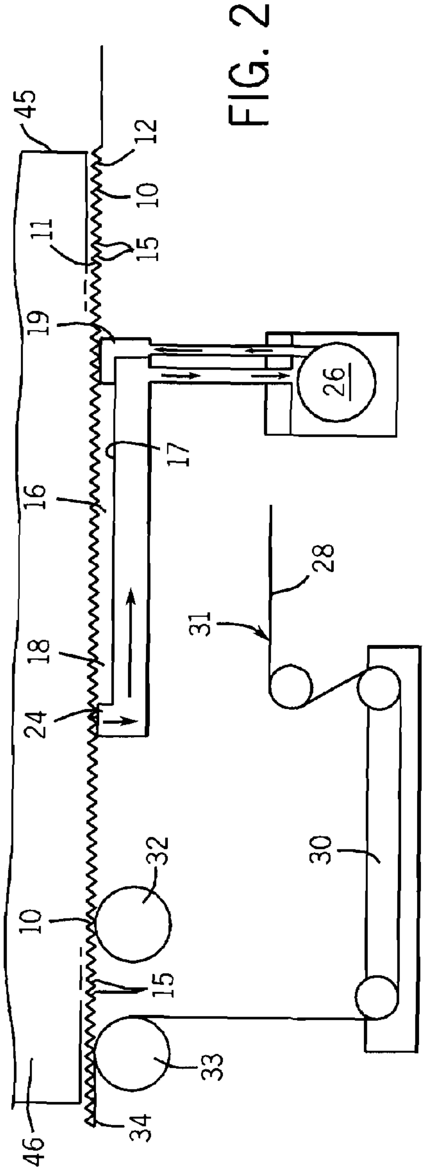
FIG. 2 is a side elevation schematic showing the FIG. 1 curing station and the curing station for the liner web.

Referring also to FIG. 2, a liner web 28, also impregnated with B-phase phenolic, is directed with a liner conveyor 31 through a second bath 30 of molten metal alloy. The liner web 28 is cured in the same manner whereby the phenolic is converted to the final phase and fully cured. A suitable adhesive is supplied to the tips of the flutes 15 by an adhesive applicator roll 32 while the medium web 10 remains carried on the underside of the upper conveyor 11. One suitable adhesive is a hot melt polyamide. The glued flute tips are joined to the cured liner web 28 on a contact roll 33 to form a fully cured single face web 34.

Figure 4:
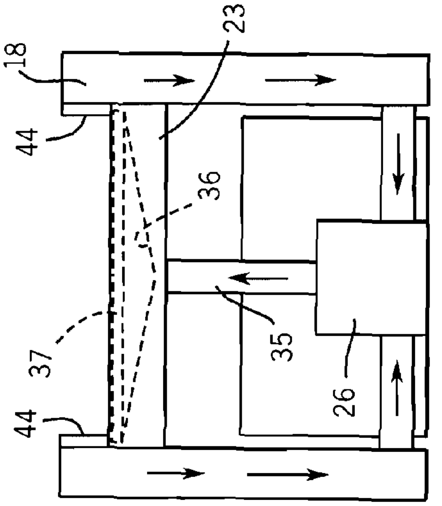
FIG. 4 is an upstream end elevation of the alloy supply header.
Figure 3:
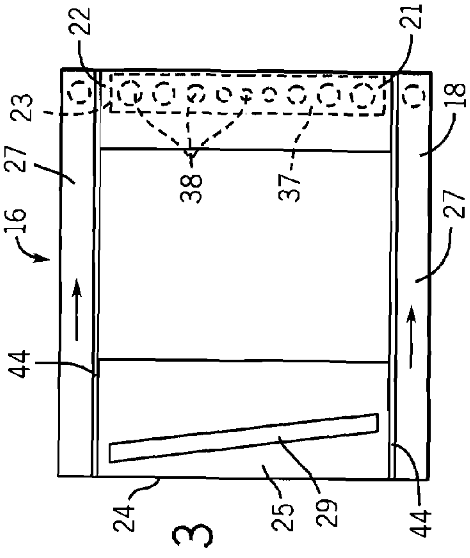
FIG. 3 is a schematic top plan view of the curing bath for the corrugated web shown in FIGS. 1 and 2.
Figure 6:
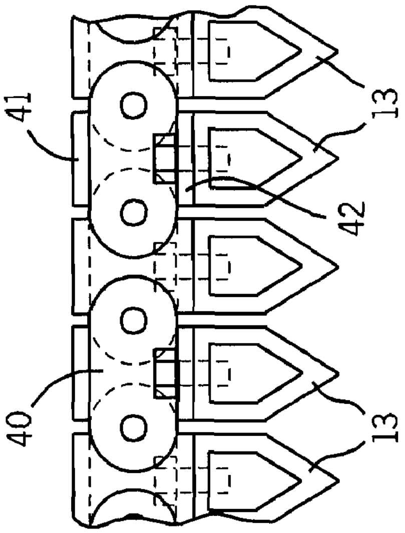
FIG. 6 is a side elevation detail of the fluting conveyor shown in FIG. 5.

FIGS. 3 and 4 show details of the molten alloy bath 16. The alloy return lines 27 are connected beneath the bath to a center alloy supply tube 35 connected to the alloy supply header 21. The supply header includes the distribution reservoir 23 which, as shown best in FIG. 4, includes an upwardly sloping lower wall 36 and an upper wall 37 that is provided with a pattern of outlet holes 38 that increase in size from the center laterally in both directions. This arrangement assures uniform distribution of the molten metal alloy across the entire width of the bottom wall 17 of the bath.

Figure 5:
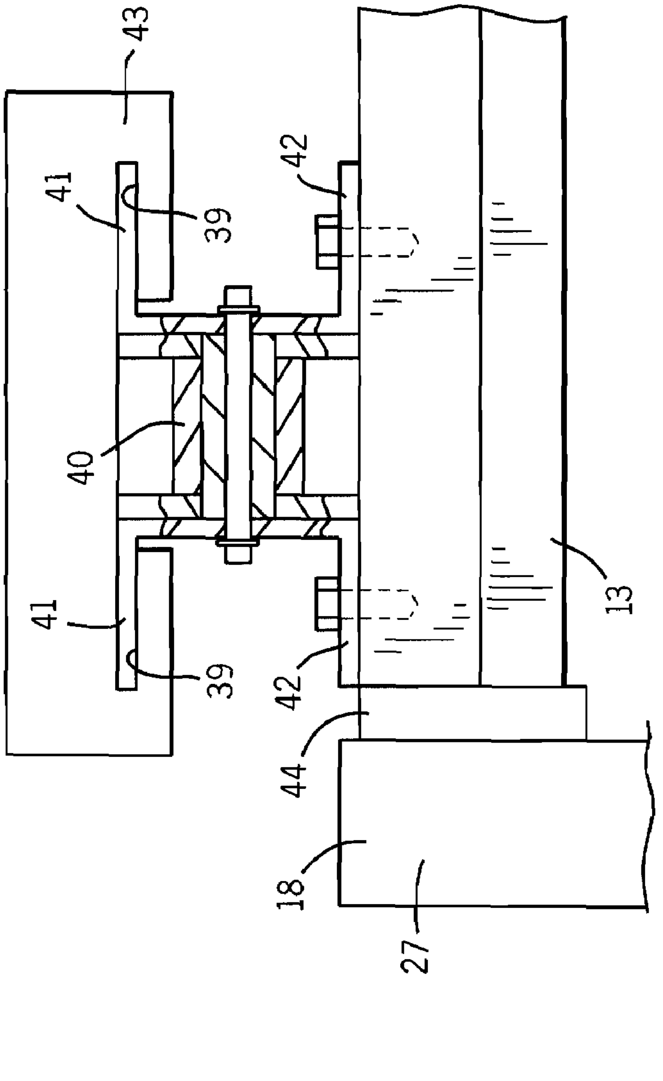
FIG. 5 is an enlarged schematic sectional view of the support and transfer arrangement for the web fluting conveyor.

As shown schematically in FIG. 5, the conveyor flights 13, which preferably comprise aluminum extrusions, are carried on a plurality of parallel laterally spaced roller chains 40 to which are attached pairs of oppositely extending upper and lower C-shaped attachments, each having horizontal mounting legs 41 and 42, respectively. The lower mounting legs 42 are secured to the flights 13 and the upper legs 41 are captured in slots 39 in a low friction plastic bearing rail 43. The bearing rail is preferably made of PTFE.

In order to inhibit leakage of the molten alloy between the conveyor 11 and the side walls 18 of the bath, the inner surface along the upper edge of each side wall is provided with a sealing strip 44 against which the opposite ends of the flights 13 of the upper conveyor 11 bear in operation. The sealing strip may be seen in FIGS. 1 and 3-5. It is preferable to apply a vacuum to the upper corrugating conveyor 11 to aid in holding the corrugated medium web 10 in intimate contact with the conveyor flights 13. One means of providing vacuum is to support the conveyor 11, via the bearing rails 43, on the underside of a vacuum plenum 45, as shown schematically in FIG. 2. The conveyor flights 13 are attached to the carrying roller chains 40 such that the faces of adjacent flights 13 are spaced apart slightly, thereby allowing the vacuum to be applied directly to the corrugated medium web 10. The sealing strip 44 also assists in sealing against vacuum loss.

We claim:

1. A method for curing a paper web impregnated with a B-phase phenolic resin, the method comprising the steps of:

(1) corrugating the resin impregnated paper web between upper and lower fluted conveyors;

(2) providing a bath of a low melting point metal alloy heated to a temperature to convert the resin impregnated paper web resin to a fully cured phase;

(3) maintaining the corrugated web in contact with the underside of the upper fluted conveyor;

(4) conveying the corrugated web on the upper fluted conveyor through the bath without submerging the corrugated web to provide direct contact of only the lower corrugated web face with the metal alloy and;

(5) maintaining contact for a time sufficient to convert the resin to the fully cured phase.

2. The method as set forth in claim 1 wherein the conveying step comprises:

(1) providing the bath with opposite side walls defining coplanar upper edges and upstream and downstream end walls having upper edges below the coplanar upper edges of the side walls; and, (2) carrying the corrugated web on the underside of the upper fluted conveyor in a path between the side walls and over the end walls.

3. The method as set forth in claim 2 including the step of sealing the interface between the lateral edges of the conveyor and the side walls.

4. The method as set forth in claim 1 wherein the corrugating step comprises carrying the resin impregnated paper web between said upper and lower fluting conveyors each having inter-engaging fluting bars.

5. The method as set forth in claim 1 including the step of applying a vacuum to the upper fluting conveyor to maintain the corrugated web in contact therewith.

6. The method as set forth in claim 1 including the steps of:

(1) conveying a paper liner web impregnated with a B-phase phenolic resin through a molten alloy bath to convert the phenolic resin to an a fully cured phase; and, (2) joining the converted corrugated web to the converted liner web to form a composite single face web.

7. The method as set forth in claim 6 wherein the joining step comprises:

(1) applying an adhesive to the flute tips of the corrugated web; and, (2) pressing the liner web against the flute tips.

* * * * *